United States Patent
Furui

(10) Patent No.: US 6,822,699 B2
(45) Date of Patent: Nov. 23, 2004

(54) CATHODE RAY TUBE AND METHOD OF DISPLAYING PICTURE

(75) Inventor: Koichi Furui, Kanagawa (JP)

(73) Assignee: Sony Corporation (JP)

( * ) Notice: Subject to any disclaimer, the term of this patent is extended or adjusted under 35 U.S.C. 154(b) by 791 days.

(21) Appl. No.: 09/778,739

(22) Filed: Feb. 8, 2001

(65) Prior Publication Data

US 2002/0012070 A1 Jan. 31, 2002

(30) Foreign Application Priority Data

Feb. 9, 2000 (JP) .................................. P2000-038063

(51) Int. Cl.[7] .......................... H04N 5/68; H04N 5/445
(52) U.S. Cl. ...................... 348/778; 348/805; 348/564; 348/566
(58) Field of Search ................................ 348/566, 805, 348/563, 564, 565, 739, 776, 778, 808, 143, 156; 345/22; 315/1, 375, 382.1; H04N 5/445, 5/45, 7/18, 5/74, 5/68

(56) References Cited

U.S. PATENT DOCUMENTS

| | | | |
|---|---|---|---|
| 3,890,541 A | 6/1975 | McCarthy | ................... 315/366 |
| 4,370,675 A | * 1/1983 | Cohn | .......................... 348/156 |
| 5,091,718 A | * 2/1992 | Beatty | .......................... 345/22 |
| 5,418,075 A | 5/1995 | Utsumi | ........................ 428/690 |
| 5,923,363 A | * 7/1999 | Elberbaum | .................. 348/156 |

FOREIGN PATENT DOCUMENTS

| | | |
|---|---|---|
| DE | 198 56 589 | 5/1999 |
| FR | 2 487 120 | 1/1982 |
| GB | 1 510 798 | 5/1978 |
| JP | 61195062 | 1/1987 |
| JP | 09023418 | 1/1997 |
| WO | 99/59340 | 11/1999 |

OTHER PUBLICATIONS

European Search Report.

* cited by examiner

Primary Examiner—Sherrie Hsia
(74) Attorney, Agent, or Firm—Rader, Fishman & Grauer PLLC; Ronald P. Kananen

(57) ABSTRACT

A main picture is displayed in monochrome in a main picture display area by emission of a first phosphor layer formed of a white emission phosphor. A second phosphor layer formed of a phosphor different from the first phosphor layer is provided in a region different from the first phosphor layer. Icons are displayed in the icon display area in a color different from the main picture by emission of the second phosphor layer.

5 Claims, 13 Drawing Sheets

X2 : Y2 = 4 : 3

X2 : Y2 = 4 : 3

X1 : Y1 = 4 : 3
X2 : Y2 = 4 : 3

$X1 : Y1 = 4 : 3$

CATHODE RAY TUBE AND METHOD OF DISPLAYING PICTURE

BACKGROUND OF THE INVENTION

1. Field of the Invention

The invention relates to a cathode ray tube, which displays a main picture in a single color, and a method of displaying pictures.

2. Description of the Related Art

In recent years, a number of picture display devices capable of displaying a color picture have been developed. Devices displaying a picture in monochrome (single color), such as what are called monochrome display devices, also have been in demand and have been developed. For example, in the field of front-door intercoms, color picture displays using liquid crystal display devices are of use. However, monochrome display devices using a flat type cathode ray tube (flat CRT) with relatively low costs also are often in use, since color liquid crystal display devices have relatively high costs.

A flat CRT has a configuration in which electron guns and a fluorescent screen are provided on the same plane, and electron beams are emitted obliquely on the fluorescent screen, unlike a straight-type CRT in which electron beams are emitted from the electron guns vertically to the center of the fluorescent screen. A straight-type CRT is capable of color picture display by discriminating three electron beams producing red (R), green (G) and blue (B) through a color selection mechanism and by emitting the electron beams on a fluorescent screen comprising three kinds of phosphor emitting in red, blue and green. A flat CRT for displaying a monochrome picture displays a monochrome picture by, for example, forming the whole fluorescent screen by white emitting phosphor and scanning the fluorescent screen by a single electron beam. The flat CRT is often used for, for example, the picture display unit of a master apparatus of a front-door intercom or the monitor of a portable television set, since the flat CRT can be formed thinner than the straight-type CRT.

In a flat CRT for a monochrome display, there is also the case where a color picture display is partially preferred. A front-door intercom with various kinds of sensors, such as a fire detector, and a gas detector serves as a security system as a whole. In such a system, it is desirable, in the master apparatus, to notify the user by displaying the emergency in a different color (for example, red) from the regular color used for the main picture display, so that users can be alerted. However, in a front-door intercom of the related art using a flat CRT for a monochrome display, it is necessary to provide a separate device for a color display in addition to the regular picture display using the flat CRT, in order to display a warning in case of emergency. An example of a device for color a display used in a front-door intercom of the related art is one in which the light of a lamp in a predetermined color (for example, white or red) is emitted from the reverse side onto a transparent substrate to which patterns, such as letters or figures, are color-printed so that the color-printed areas emit light.

In the display method mentioned above, the warning effect is poor since, for example, the warning is displayed simply by a red lamp or the like, so that the picture display is monotonic. In the related art, it is necessary to physically provide a display area separate from the main picture display area by providing a display device only for color display in addition to the flat CRT, which displays the main picture. This could be an obstacle to miniaturizing the device.

There are still other problems. For example, in the case where a device for color display is composed of a lamp and a color-printed substrate, the cost of providing electric wiring is required in addition to the lamp and the color-printed substrate. Furthermore, in the related art, the design of the device becomes limited since it is necessary to separately provide the display area for warning.

In the front-door intercom and the like of the related art, if a specific figured picture indicating warning and the like is to be displayed by only using a CRT without separately providing a display device for warning only, it is necessary to provide a character signal generator for providing the picture to be displayed. In such a device structure, the portion with black-level signals is formed by blanking picture signals inputted in a normal state. Then, the picture signals generated by the character signal generator are superimposed on the portion with black-level signals or the picture signals generated by the character signal generator are directly superimposed on the picture signals inputted in a normal state. Thereby, a picture indicating warning and the like is displayed. However, in such a device structure, it is necessary to provide a character signal generator for making a specific picture, which is costly. Also, if a method of picture display by such structure is applied to a flat CRT for monochrome display, all of the picture can be only displayed in monochrome. Therefore, even if the method is used for a picture display for warning, the warning effect is poor.

SUMMARY OF THE INVENTION

The invention has been designed to overcome the foregoing problems. An object of the invention is to provide a CRT and a method of picture display, which can easily perform picture display in colors different from that of the main picture display.

The CRT of the invention displays a main picture in a single color and comprises: an electron gun for emitting electron beams; a first picture display unit including a phosphor which emits a single color upon incidence of electron beams while displaying a main picture by emission of the single color emission phosphor; and a second picture display unit including another phosphor which emits a color different from the single color emission phosphor upon incidence of the electron beams in a region different from the region where the single color emission phosphor is provided for displaying another picture in a color different from that of the display of the main picture by emission of the other phosphor.

The method of displaying a picture of the invention is a method in which a CRT displays a main picture in a single color, wherein a phosphor emitting a single color upon incidence of electron beams is provided and a main picture is displayed in a single color by emission of the single color emission phosphor, and another phosphor emitting a color different from the single color emission phosphor upon incidence of electron beams is provided in a region different from the region where the single color emission phosphor is provided, and another picture is displayed in another color different from the main picture by emission of the another phosphor.

In the CRT and the method of displaying a picture of the invention, a main picture is displayed in a single color by emission of the single color emission phosphor, and another picture is displayed in another color different from the main picture by emission of another phosphor provided in a region different from the region where the single color emission phosphor is provided.

In the invention, the single color emission phosphor is, for example, a white emission phosphor that emits in white. The white emission phosphor includes, in addition to a phosphor emitting white by itself, a phosphor composed of, for example, a blue emission phosphor and a yellow emission phosphor mixed in an appropriate proportion so as to look like a white emission phosphor. Also, in the invention, a single color does not only mean a single wavelength region of light but includes the case where a plurality of wavelength regions of light are mixed and recognized as a single color by the eyes of human beings.

Other and further objects, features and advantages of the invention will appear more fully from the following description.

DETAILED DESCRIPTION OF THE PREFERRED EMBODIMENTS

Preferred embodiments of the invention will now be described in detail in the following with reference to the drawings.

Figure 1:
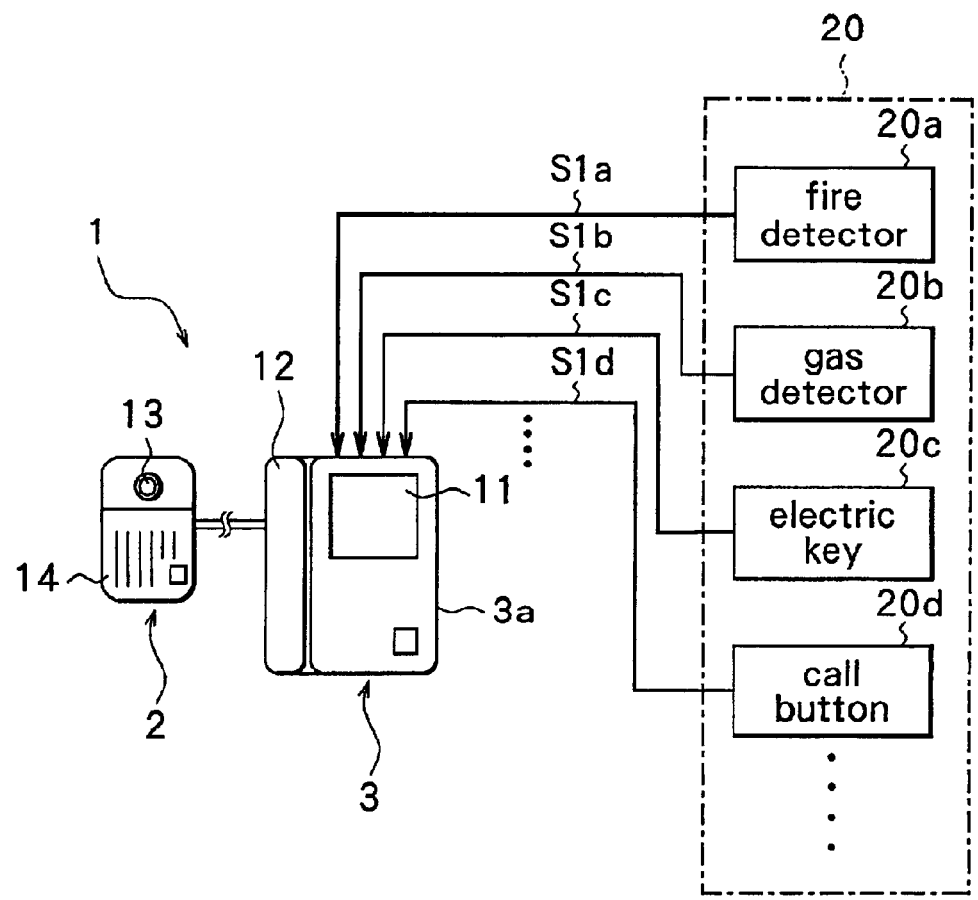
FIG. 1 is a structural figure showing a draft of a front-door intercom of the invention and its peripheral apparatuses.

A front-door intercom 1 shown in FIG. 1 is connected to peripheral apparatuses 20 for security surveillance, composing a security system as a whole. The front-door intercom 1 comprises a subsidiary apparatus 2 provided, for example, at the front-door and a master apparatus 3 provided, for example, inside, which is capable of performing audio and visual communication between the subsidiary apparatus 2.

The peripheral apparatuses 20 comprise, for example, a fire detector 20a having a thermal sensor for detecting fire, a gas detector 20b having a gas sensor for detecting gas leakage, an electric key 20c capable of managing locking and unlocking electrically provided at, for example, the front door, and a call-button 20d having a push-button switch for detecting the operation state of buttons. The call-button 20d is provided for, for example, elderly people, provided at, for example, rest rooms or bathrooms, and used for notifying in the case of an emergency. The peripheral apparatuses 20 are not limited to the ones shown in FIG. 1, but other apparatuses may be used.

In the peripheral apparatuses 20, the fire detector 20a outputs fire detection signals S1a to the master apparatus 3 of the front-door intercom 1, which posts notifications of fires. The gas detector 20b outputs gas detection signals S1b to the master apparatus 3, which posts notification of gas leaks. The electric key 20c outputs detection signals S1c to the master apparatus 3, which posts notification of changes in the locking state. The call-button 20d outputs detection signals S1d to the master apparatus 3 when the button operation is performed. In the following, the signals outputted from a plurality of the peripheral apparatuses 20 are collectively referred to as surveillance signals S1.

In the front-door intercom 1, the subsidiary apparatus 2 picks up the image of visitors outside, while comprising a camera 13 having a function of transmitting the picked-up image to the master apparatus 3 and a communicator 14 composed of a speaker and a microphone having a function of audio communication between the master apparatus 3. The subsidiary apparatus 2 generates frequency modulation signals by modulating the frequency of, for example, each of image signals obtained by the camera 13 and audio signals obtained by the communicator 14, and transmits the frequency modulation signals to the master apparatus 3. The subsidiary apparatus 2 receives frequency-modulated audio signals from the master apparatus 3, using, for example a frequency band different from the one used for transmission to the master apparatus 3, and outputs the audio signals from the communicator 14.

In the front-door intercom 1, the master apparatus 3 comprises a cuboid main body 3a. The master apparatus 3 comprises a picture display unit 11 located in, for example, the front face of the main body 3a, and the communicator 14 located in, for example, the side area of the main body 3a. The communicator 14 includes a speaker and a microphone, having a function of audio communication between the subsidiary apparatus 2. The picture display unit 11 displays a picture formed by a flat type cathode ray tube (flat CRT) 30 (FIG. 2), which will be described later, and has a function of mainly displaying the image picked up by the camera 13 of the subsidiary apparatus 2.

Figure 2:
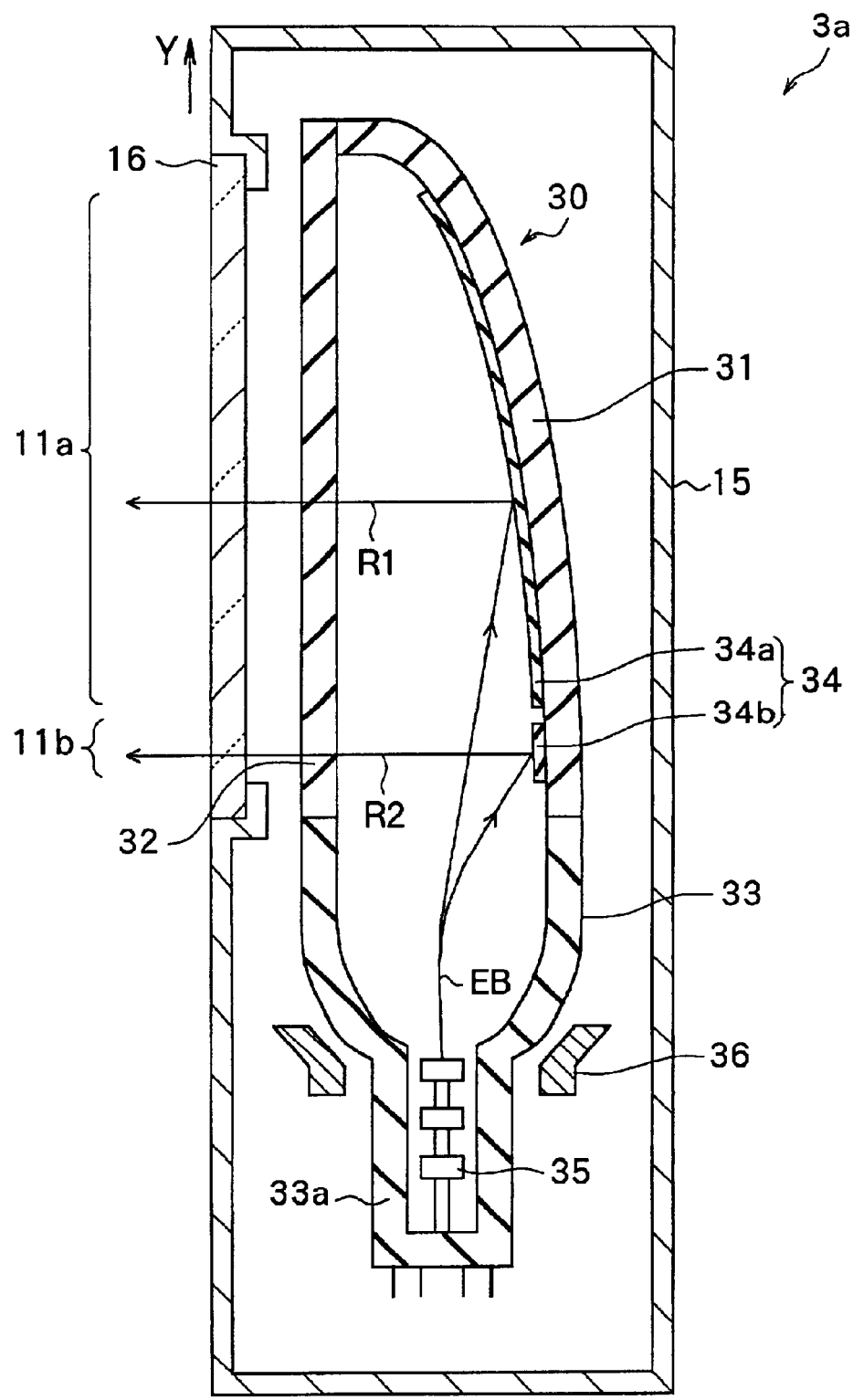
FIG. 2 is a cross section showing the main structure of the main body of the master apparatus of a front-door intercom of the invention.

Y direction shown in FIG. 2 corresponds to the upward direction of the screen of the picture display unit 11. As shown in FIG. 2, the main body 3a comprises a casing 15 forming a cuboid appearance. A flat CRT 30 is incorporated inside the casing 15. In FIG. 2, a reflection-mode CRT is shown as an example of a flat CRT. The flat CRT 30 comprises a screen panel 31, a front panel (display panel) 32 and a funnel 33. The screen panel 31, the front panel 32 and the funnel 33 are formed of a transparent glass member, and the flat glass tubes are composed of the three-bodied structure with the three panels. A neck 33a having a thin-long shape to which electron gun 35 is provided is formed in the back end of the funnel 33. In the funnel 33, deflection yoke 36 is provided in the peripheral portion of the neck 33a for performing deflection control on electron beams EB emitted from the electron guns 35. In the casing 15, a protection member 16 for protecting the front panel 32 is provided in the portion corresponding to front panel 32 of the flat CRT 30. The protection member 16 is formed of, for example, a transparent resin.

The electron guns 35, although the detail is not shown in the figure, have a configuration in which a plurality of grids are arranged in the front portion of a thermionic cathode body comprising a cathode (thermionic cathode), so as to perform controlling, acceleration and the like of the electron beams EB emitted from the cathode in each grid. The electron beams EB emitted from the electron guns 35 are deflection-controlled by the deflection yokes 36 and are emitted onto a phosphor layer 34 formed on the screen panel 31.

The front panel 32 is plane. The screen panel 31 is curved in the vertical direction (upward and downward direction). A conductive reflection film is formed by evaporating, for example, aluminum (Al) in the inner wall of the screen panel 31, that is, in the surface facing the front panel 32. The phosphor layer 34 also is formed in the inner wall of the screen panel 31 with the reflection film in between. The reflection film formed in the screen panel 31 has a function of reflecting luminous light generated by the incidence of the electron beams EB to the phosphor layer 34 to the front panel 32. In the flat CRT 30, the optical picture formed by the light reflected by the reflection film can be observed from the front panel 32.

The phosphor layer 34 formed on the screen panel 31 is formed of phosphor that emits according to the incidence of the electron beams EB. In general, in the ordinal monochrome-display flat CRT, the whole phosphor layer 34a is formed of a white emission phosphor. However, in the flat CRT 30 according to the embodiment, a second phosphor layer 34b formed of another phosphor, which emits different colors from that of the white emission phosphor, is provided in addition to a first phosphor layer 34a formed of the white emission phosphor. The flat CRT 30 according to the embodiment is notably different from a flat CRT of the related art in its configuration in which, specifically, the second phosphor layer 34b is provided.

Figure 3:
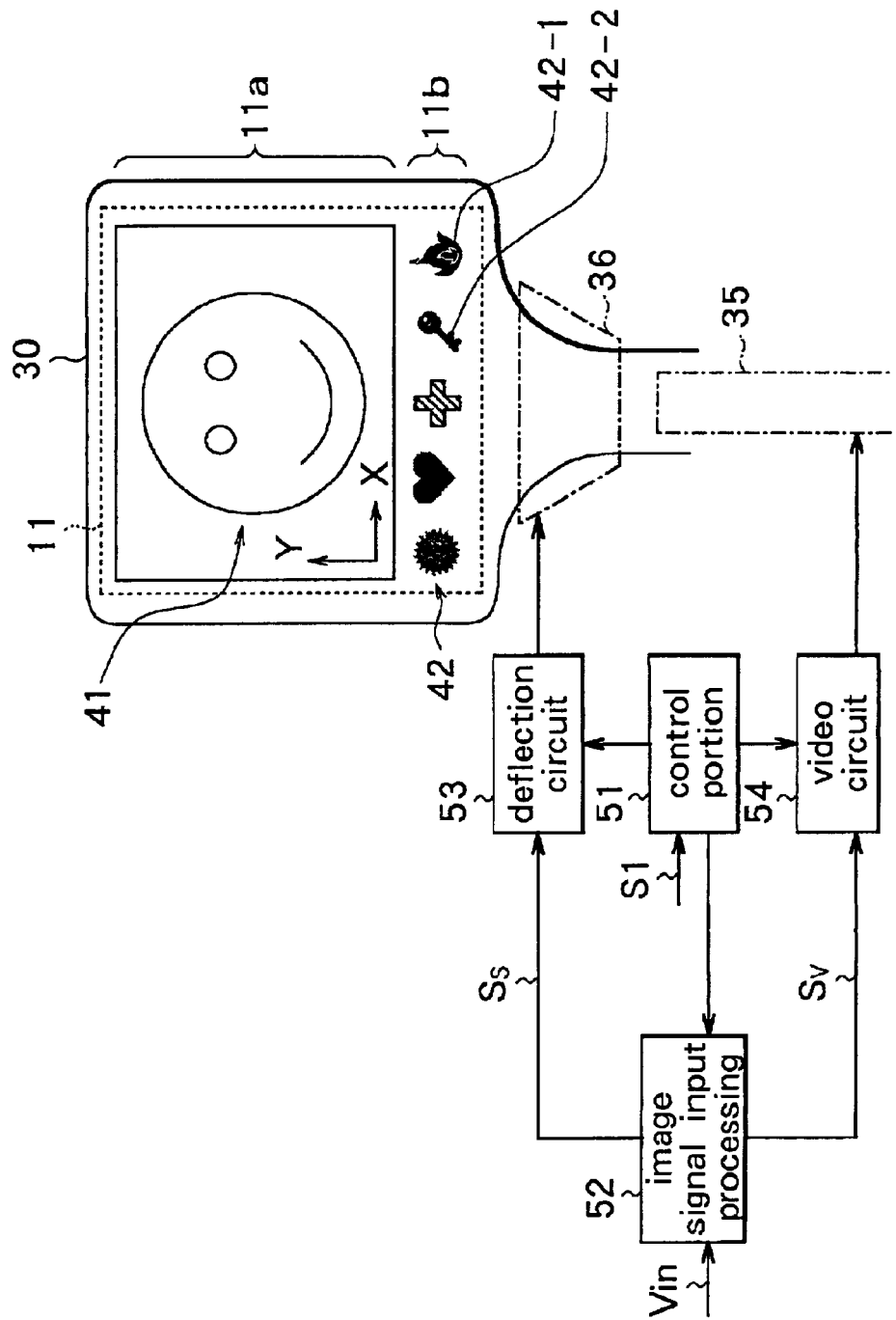
FIG. 3 is a block diagram showing a draft of the circuit in relation to the picture display in the master apparatus of a front-door intercom of the invention and the picture display area.

The first phosphor layer 34a is mainly for performing monochrome display of the image picked up by the camera 13 of the subsidiary apparatus 2 (FIG. 1). In other words, in the embodiment, an image 41 picked up by the camera 13 is monochrome-displayed in a main picture display area 11a by an emission ray R1 generated by scanning the first phosphor layer 34a by the electron beams EB, as shown in FIG. 2 and FIG. 3. In the following, as described above, the images mainly taken by camera 13 of the subsidiary apparatus 2 and displayed in the main picture display area 11a is also called a 'main picture'. The picture displayed in the main picture display area 11a is not limited to the images picked up by camera 13 of the subsidiary apparatus 2 but other images may be displayed as the main picture. The main picture display area 11a, including the first phosphor layer 34a, corresponds to a specific example of a. 'first picture display unit' of the invention.

On the other hand, the second phosphor layer 34b is provided in order to display other pictures different from the main picture displayed in the main picture display area 11a. In other words, in the embodiment, another image 42, different from the main picture, is displayed in a color different from the main picture in an icon display area 11b by an emission ray R2 generated by scanning the second phosphor layer 34b by the electron beams EB, as shown in FIG. 2 and FIG. 3. In the front-door intercom 1 according to the embodiment, what we call icons are displayed in the icon display area 11b as pictures different from the main picture, as shown in FIG. 3 and FIG. 4A to FIG. 4D. In the following, the image 42 displayed in the icon display area 11b is also called an icon.

The second phosphor layer 34b is formed in the shape of icon 42, which is to be displayed. Therefore, light is emitted in the shape of the second phosphor layer 34b, that is, the shape of the icon 42, when the region where the second phosphor layer 34b is provided is scanned by the electron beams EB. In other words, icon 42 displayed in the icon display area 11b is almost in the same shape as the formation pattern of the second phosphor layer 34b, which has been formed in a predetermined shape. The first phosphor layer 34a is provided uniformly in the region corresponding to the main picture display area 11a. However, it is not necessary to provide the second phosphor layer 34b in the whole region corresponding to the icon display area 11b. Basically, the second phosphor layer 34b is partially provided only in the region where icon 42 is to be displayed. In this case, the region where the icon 42 is not displayed (the region where the second phosphor layer 34b is not provided) may have a configuration of a so-called black matrix in which, for example, black substances (graphite and the like) are laminated. The icon display area 11b, including the second phosphor layer 34b, corresponds to a specific example of a 'second picture display unit' of the invention.

In FIG. 4A to FIG. 4D, the slashed region represents the phosphor. In the embodiment, the examples of icon 42 displayed in the icon display area 11b are symbols, characters and various kinds of figures (circles, quadrangles or any shapes). The second phosphor layer 34b is formed in the shapes of these various kinds of icons.

Figure 4A:
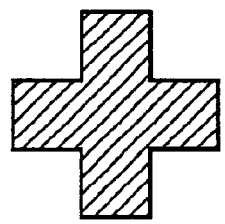
FIG. 4A to FIG. 4D are figures for describing examples of the shapes of icons formed in a second phosphor layer of a flat CRT.
Figure 4B:
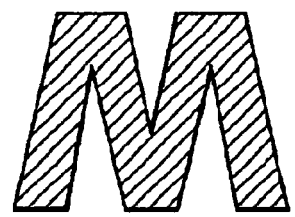

For example, FIG. 4A is an example of the second phosphor layer 34b formed in the shape of a symbol. FIG.

Figure 4C:
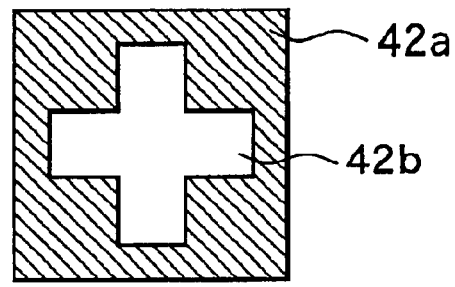
Figure 4D:
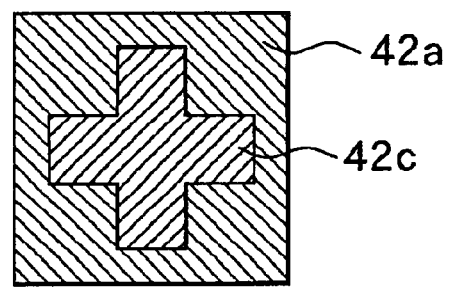

4B is an example of the second phosphor layer 34b formed in the shape of the character 'M'. FIG. 4C is an example in which the peripheral of region 42b, where the phosphor is not provided, is surrounded by a phosphor layer 42a in the shape of a symbol, so that the second phosphor layer 34b is formed in the shape of a symbol as a whole. FIG. 4D is an example in which the second phosphor layer 34b is formed of the phosphors in two colors. In FIG. 4D, the peripheral of the phosphor layer 42c formed in the shape of a symbol is surrounded by the phosphor layer 42a formed of the phosphor in a color different from the phosphor layer 42c. As described, the second phosphor layer 34b may be formed of phosphors in a plurality of colors. In the flat CRT 30 according to the embodiment, icon 42 in almost the same shape as the formation pattern of the second phosphor layer 34b is displayed in the icon display area 11b by the electron beams EB scanning the second phosphor layer 34b formed as described. In the flat CRT 30 according to the embodiment, the phosphor layer itself is formed in the shape of icon 42. Therefore, icons in complicated shapes can be displayed with high precision compared to the case where the shapes of icon 42 are formed by scanning by the electron beams themselves.

A more specific example of the icon 42 displayed in the icon display area 11b as another picture is, for example, an icon for warning in case of an emergency. Icons for warning are, for example, ones that correspond to kinds of the surveillance signals S1 from the peripheral apparatuses 20 (FIG. 1). For example, if the surveillance signals S1 are signals from the fire detector 20a, it is preferable to perform an icon display so that the occurrence of fire can be easily conveyed to the users. That is, the icon 42 displayed in icon display area 11b may be better in the shape of fire, for example, like icon 42-1 shown in FIG. 3. For example, if the surveillance signals S1 are signals from the electric key 20c indicating a change in the locking state, the icon 42 displayed in icon display area 11b may be better in the shape of a key, for example, like icon 42-2 shown in FIG. 3. Furthermore, not only the shapes of icons but also the colors of icons are preferable for a good warning. In the case of icon 42-1, indicating the occurrence of fire may be displayed in a color representing fire (for example, red). Coloring icon 42 can be easily achieved by forming a second phosphor layer 34b using the phosphor which emits the desired color.

A method of manufacturing the first phosphor layer 34a and the second phosphor layer 34b will now be briefly described. The first phosphor layer 34a and the second phosphor layer 34b can be formed by laminating the phosphor substance in the inner wall of the screen panel 31 by printing such as thermal transfer printing or by electrodeposition. The first phosphor layer 34a and the second phosphor layer 34b may be formed simultaneously by, for example, printing or may be formed through separate steps. After forming the first phosphor layer 34a by electrodepositing, the second phosphor layer 34b may be formed separately by printing. Specifically, the second phosphor layer 34b is easily formed using a method in which the portion with printed icons in the printed film to which arbitrary icon shapes are printed is transcribed to the inner wall of the screen panel by thermal transfer printing. By applying this method, it becomes possible to form arbitrary icon shapes in the second phosphor layer 34b easily and at low cost as a special order at a request of the users of the front-door intercom 1.

In FIG. 2 and FIG. 3, an example is shown in which the second phosphor layer 34b is provided in the lower side of the screen than the side of the first phosphor layer 34a, and the main picture display area 11a is located in the lower side than the icon display area 11b. However, the positioning of the first phosphor layer 34a and the second phosphor layer 34b and the positioning of the main picture display area 11a and the icon display area 11b are not limited to these.

FIG. 5 to FIG. 14 show many of specific examples of the position where icon display area 11b is provided. In the screen panel 31 (FIG. 2) of the flat CRT 30, the second phosphor layer 34b can be provided in, for example, at least one of the regions above, below, the left-hand side or the right-hand side of the region where the first phosphor layer 34a is provided.

Figure 5:
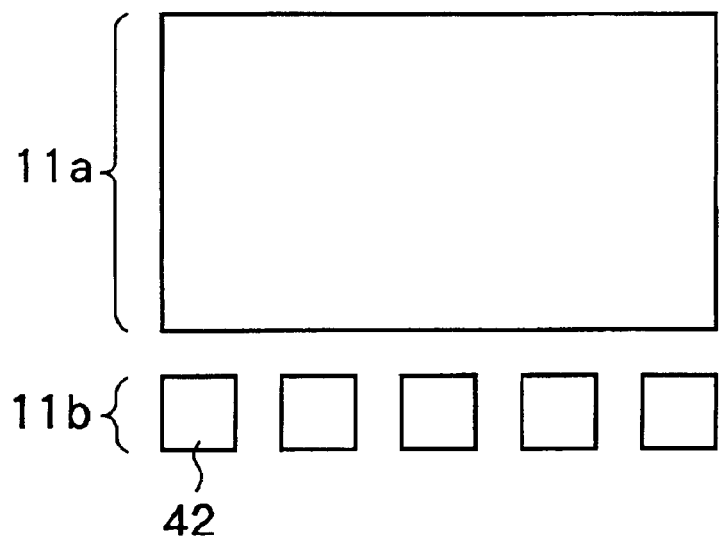
FIG. 5 is a figure for describing an example in which an icon display area is provided under a main picture display area.
Figure 6:
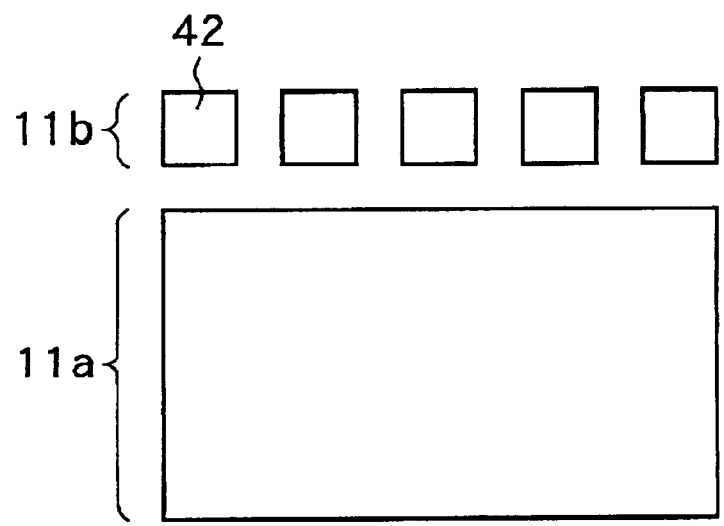
FIG. 6 is a figure for describing an example in which an icon display area is provided above the main picture display area.
Figure 7:
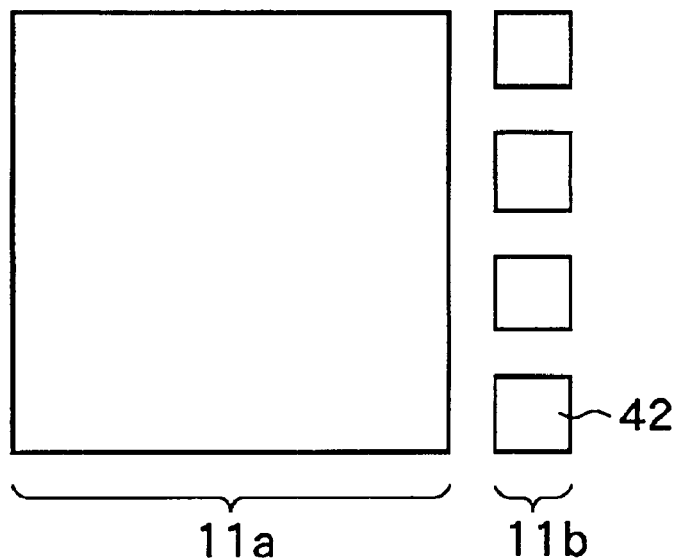
FIG. 7 is a figure for describing an example in which an icon display area is provided in the right-hand side of the main picture display area.
Figure 8:
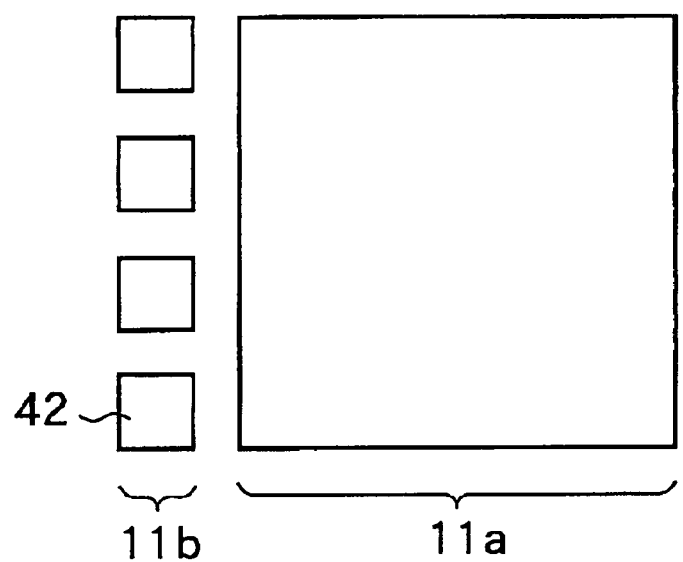
FIG. 8 is a figure for describing an example in which an icon display area is provided in the left-hand side of the main picture display area.

FIG. 5 to FIG. 8 are examples in which the second phosphor layer 34b is provided only in one of the regions above, below, the left-hand side or the right-hand side of the region where the first phosphor layer 34a is provided. FIG. 5 shows an example in which, like the example shown in FIG. 2 and FIG. 3, the second phosphor layer 34b is provided below the first phosphor layer 34a, and the icon display area 11b is formed below the main picture display area 11a in the picture display unit 11 of the master apparatus 3. FIG. 6 shows an example in which the second phosphor layer 34b is provided above the first phosphor layer 34a, and the icon display area 11b is formed above the main picture display area 11a. FIG. 7 shows an example in which the second phosphor layer 34b is provided on the right-hand side of the first phosphor layer 34a, and the icon display area 11b is formed on the right-hand side of the main picture display area 11a. FIG. 8 shows an example in which the second phosphor layer 34b is provided on the left-hand side of the first phosphor layer 34a, and the icon display area 11b is formed on the left-hand side of the main picture display area 11a.

Figure 9:
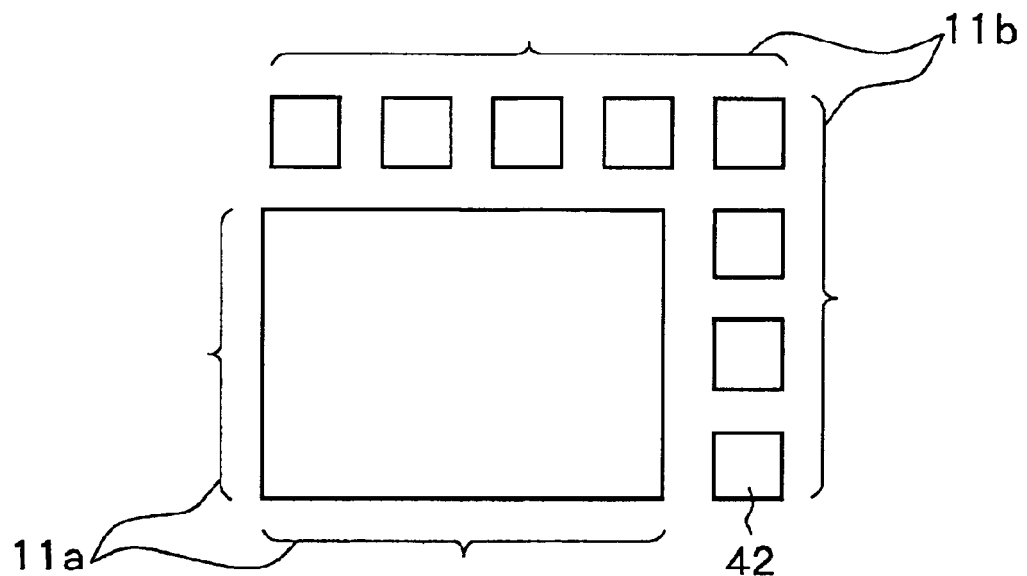
FIG. 9 is a figure for describing an example in which an icon display area is provided above and in the right-hand side of the main picture display area.
Figure 10:
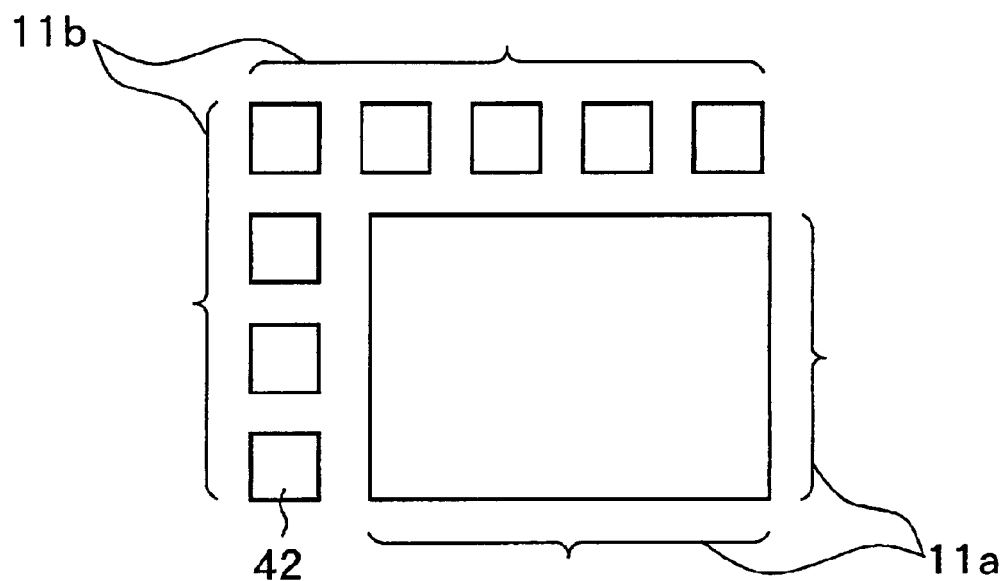
FIG. 10 is a figure for describing an example in which an icon display area is provided above and in the left-hand side of the main picture display area.
Figure 11:
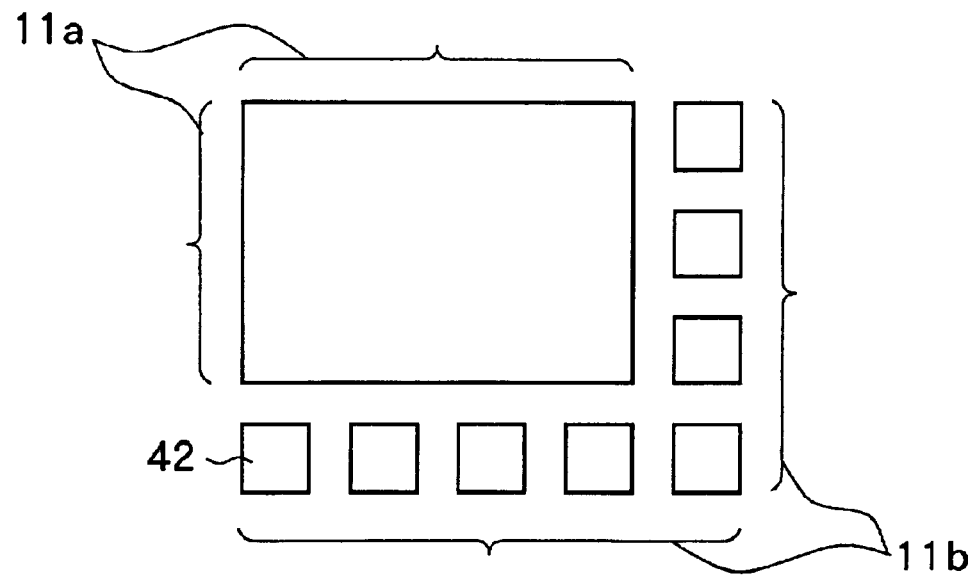
FIG. 11 is a figure for describing an example in which an icon display area is provided under and in the right-hand side of the main picture display area.
Figure 12:
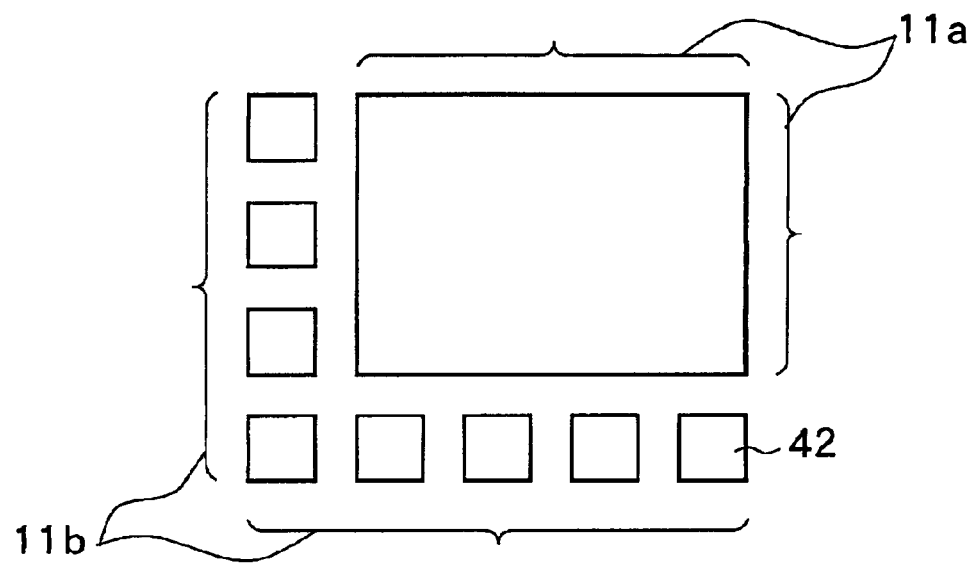
FIG. 12 is a figure for describing an example in which an icon display area is provided under and in the left-hand side of the main picture display area.

FIG. 9 to FIG. 12 show examples in which the second phosphor layer 34b is provided in two regions above, below, the left-hand side or the right-hand side of the region where the first phosphor layer 34a is provided. For example, FIG. 9 is an example in which the second phosphor layer 34b is formed above and in the right-hand side of the first phosphor layer 34a, and the icon display area 11b is provided above and in the right-hand side of the main picture display area 11a. FIG. 10 shows an example in which the second phosphor layer 34b is provided above and in the left-hand side of the first phosphor layer 34a, and the icon display area 11b is formed above and in the left-hand side of the main picture display area 11a. FIG. 11 shows an example in which the second phosphor layer 34b is formed below and in the right-hand side of the first phosphor layer 34a, and the icon display area 11b is provided below and in the right-hand side of the main picture display area 11a. FIG. 12 shows an example in which the second phosphor layer 34b is formed below and in the left-hand side of the first phosphor layer 34a, and the icon display area 11b is provided below and in the left-hand side of the main picture display area 11a.

Figure 13:
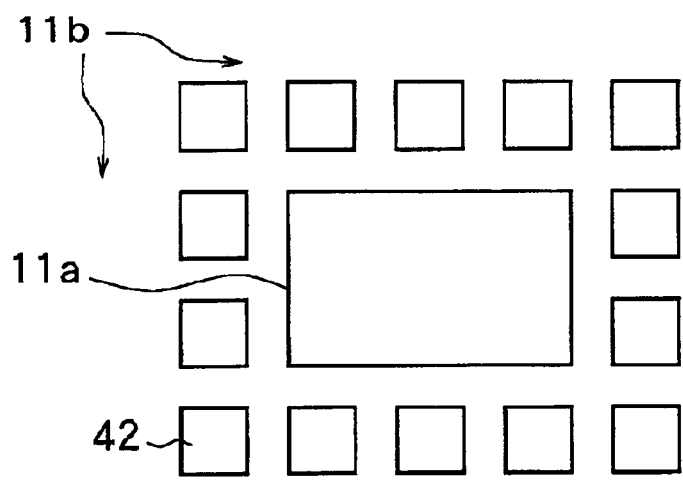
FIG. 13 is a figure for describing an example in which an icon display area is provided in the whole area around the main picture display.
Figure 14:
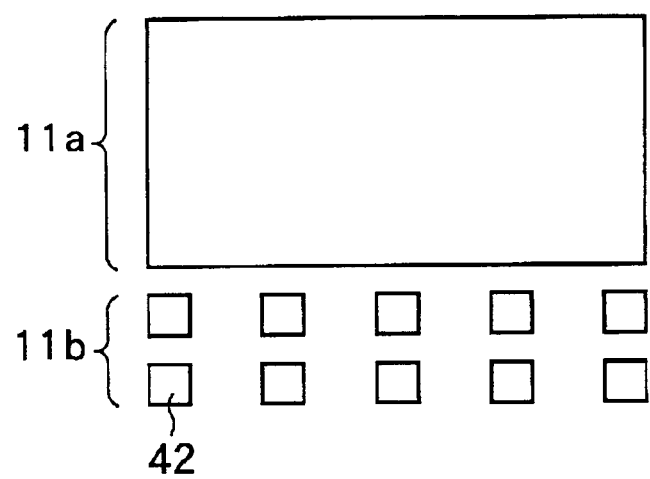
FIG. 14 is a figure for describing an example in which two lines of icon display areas are provided under the main picture display area.

FIG. 13 shows an example in which the second phosphor layer 34b is provided in the whole regions above, below, in the right-hand side and the left-hand side of the first phosphor layer 34a surrounding the region wherein the first phosphor layer 34a is provided, and the icon display area 11b is formed in the whole regions above, below, in the right-hand side and the left-hand side of the main picture display area 11a FIG. 14 shows an example in which two lines of the second phosphor layer 34b are provided below the first phosphor layer 34a, and two lines of the icon display area 11b are formed below the main picture display area 11a.

Positioning of the first phosphor layer 34a and the second phosphor layer 34b and positioning of the main picture display area 11a and the icon display area 11b are not limited to the examples shown in FIG. 5 to FIG. 14, but other positioning may be applicable. For example, FIG. 5 to FIG. 13 show examples in which only one line of icon display area 11b is provided above, below, in the right-hand side or the left-hand side of the main picture display area 11a. However, two or more lines of the icon display area 11b may be provided in all the examples.

Next, the aspect ratio of the main picture display area 11a and the icon display area 11b will be described by mainly referring to FIG. 15 to FIG. 19.

Figure 15:
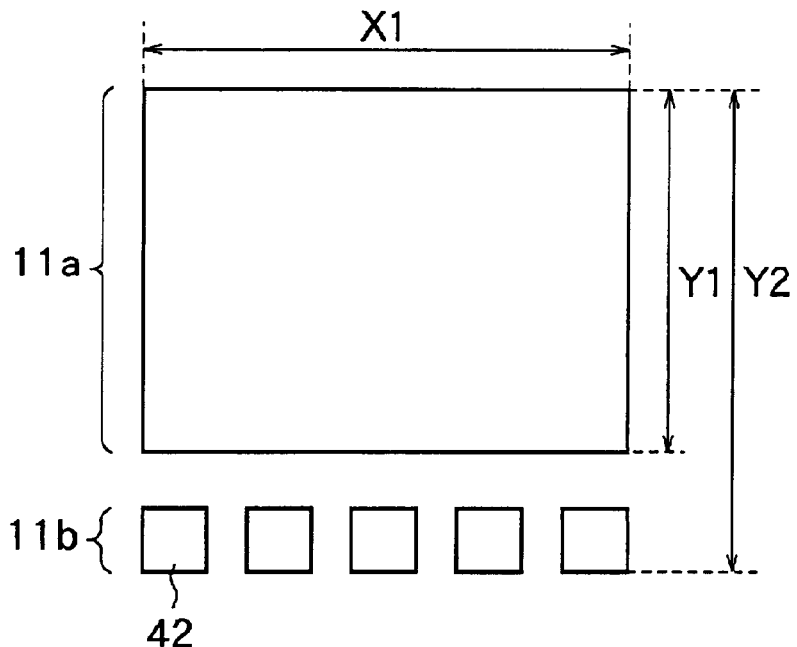
FIG. 15 is a figure for describing a form example of the whole display area in the case where the aspect ratio of the main picture display area of the picture display unit is 4:3.

First, the case where the ratio of the lateral length X1 and the longitudinal length Y1 of the main picture display area 11a is 4:3, as in the ordinary picture display device, is described. In the case where the icon display area 11b is formed below or above the main picture display area 11a as in the examples shown in FIG. 5 and FIG. 6, if the aspect ratio of the main picture display area 11a is 4:3, it is necessary to provide a display area close to the aspect ratio of, for example, 1:1 (square shape) in the total area of the main picture display area 1a and the icon display area 1b. In this case, as shown in FIG. 15, the lateral length of the total display area of the main picture display area 1a and the icon display area 11b is equal to the lateral length X1 of the main picture display area 11a. However, the longitudinal length Y2 is longer than the longitudinal length Y1 of the main picture display area 11a.

Figure 16:
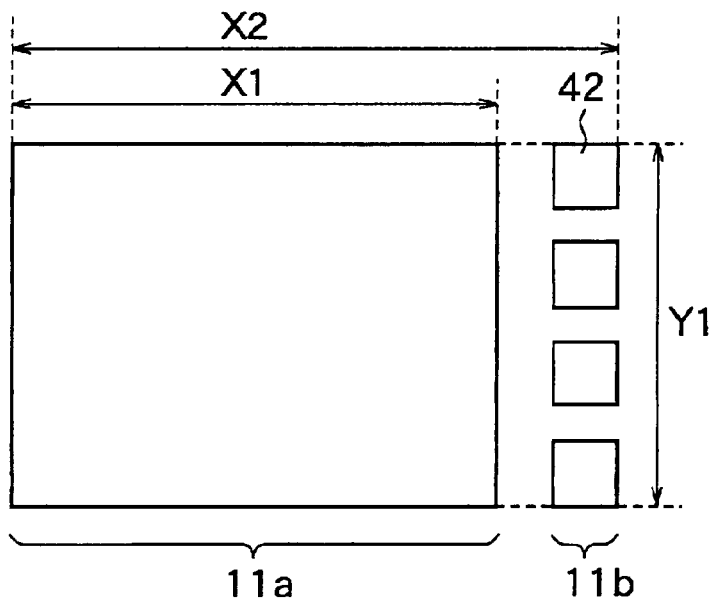
FIG. 16 is a figure for describing another form example of the whole display area in the case where the aspect ratio of the main picture display area of the picture display unit is 4:3.

As in the examples shown in FIG. 7 and FIG. 8, in the case where the icon display area 11b is formed on the right-hand side or the left-hand side of the main picture display area 11a, if the aspect ratio of the main picture display area 11a is 4:3, it is necessary to provide a wide display area close to the aspect ratio of, for example, 16:9 in the total area of the main picture display area 11a and the icon display area 11b. In this case, as shown in FIG. 16, the longitudinal length of the total display area of the main picture display area 11a and the icon display area 11b is equal to the longitudinal length Y1 of the main picture display area 11a. However, the lateral length X2 is longer than the lateral length X1 of the main picture display area 11a.

Figure 17:
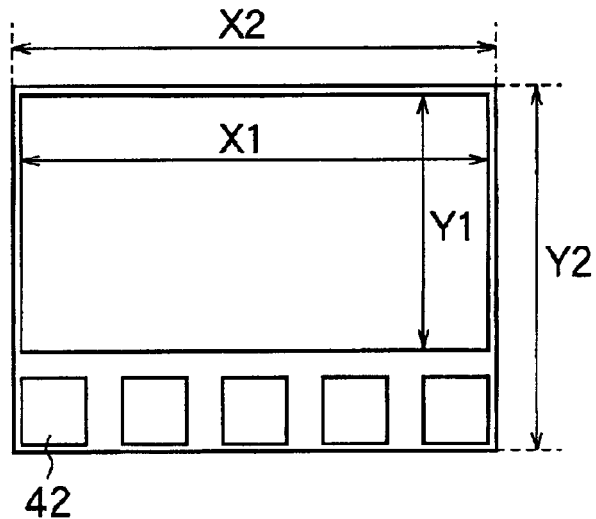
FIG. 17 is a figure for describing a form example of the whole display area in the case where the aspect ratio of the whole display area of the picture display unit is 4:3.
Figure 18:
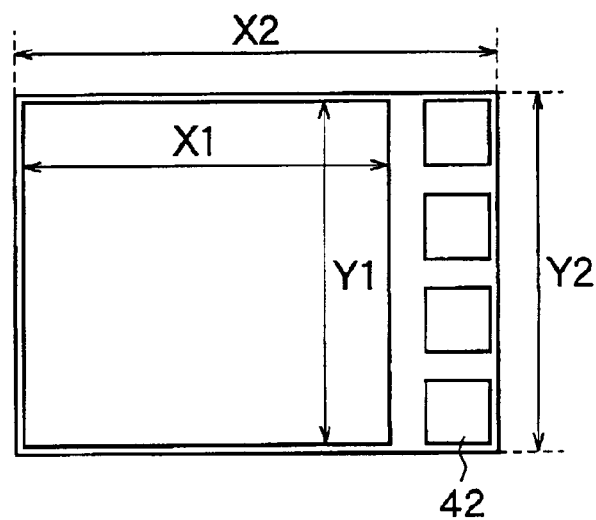
FIG. 18 is a figure for describing another form example of the main display area in the case where the aspect ratio of the whole display area of the picture display unit is 4:3.

The case where the ratio of the lateral length X2 and the longitudinal length Y2 of the total display area of the main picture display area 11a and the icon display area 11b is 4:3 the ordinary picture display device. For example, as the examples shown in FIG. 5 and FIG. 6, in the case where the icon display area 11b is formed below or above the main picture display area 11a, if the aspect ratio of the total display area is 4:3, the main picture display area 11a becomes, for example, wide. In this case, as shown in FIG. 17, the lateral length X1 of the main picture display area 11a is almost equal to the lateral length X2 of the total display arm. However, the longitudinal length Y1 becomes shorter than the longitudinal length Y2 of the total display area.

As the examples shown in FIG. 7 and FIG. 8, in the case where the icon display area 11b is formed on the right-hand side or the left-hand side of the main picture display area 11a, if the aspect ratio of the total picture display area is 4:3, the main picture display area 11a becomes a display area close to the aspect ratio of, for example, 1:1 (square shape). In this case, the longitudinal length Y1 of the main picture display area 11a is almost equal to the longitudinal length Y2 of the total display area. However, the lateral length X1 becomes shorter than the lateral length X2 of the total display area.

Figure 19:
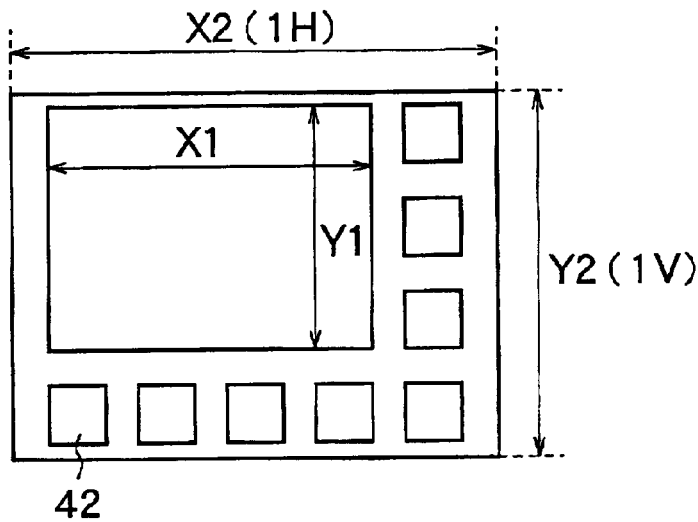
FIG. 19 is a figure for describing still another form example of the main display area in the case where the aspect ratio of the whole display area of the picture display unit is 4:3.

As the examples shown in FIG. 9 to FIG. 12, in the case where the icon display area 11b is formed in two regions among four regions of above, below, the left-hand side and the right-hand side wherein the main picture display area 11a is provided, if the aspect ratio of the total display area is 4:3, the aspect ratio of the main picture display area 11a is, for example, 4:3. In this case, as shown in FIG. 19, the longitudinal length Y1 and the lateral length X1 of the main picture display area 11a become shorter than the longitudinal length Y2 and the lateral length X2 of the total display area.

The correlation between the aspect ratio of the main picture display area 11a and the aspect ratio of the total display area is not limited to the ones mentioned above, but the aspect ratio of each display area can be set at any value.

FIG. 3 shows a front view of the flat CRT 30 taken from the front panel 31 side. As shown in FIG. 3, the master apparatus 3 comprises, as a control circuit of the flat CRT 30, an image signal input processing 52 into which image signals Vin taken by, for example, camera 13 of the subsidiary apparatus 2 (FIG. 1) are inputted and performs amplifying or the like of the inputted image signals Vin, a deflection circuit 53 which separates horizontal synchronizing signals and vertical synchronizing signals included in image signals Ss outputted from the image signal input processing 52 and controls the deflection yoke 36 based on the horizontal synchronizing signals and the vertical synchronizing signals obtained, and a video circuit 54 which, based on luminance signals included in image signals Sv outputted from the image signal input processing 52, drives the electron guns 35 and controls the amount of electron beams EB emitted from the electron guns 35. The master apparatus 3 also comprises a control unit 51 to which surveillance signals S1 from the peripheral apparatuses 20 (FIG. 1) are inputted and which controls the image signal input processing 52, the deflection circuit 53 and the video circuit 54 based on the inputted surveillance signals S1. The master apparatus 3 further comprises an audio circuit for, for example, performing audio communication between the subsidiary apparatus 2, in addition to the circuits shown in the figure. However, since the distinctive feature of the master apparatus 3 according to the embodiment is mainly about picture display, the description in detail will be omitted.

The control unit 51, when the surveillance signals S1 from the peripheral apparatuses 20 (FIG. 1) are inputted, controls the image signal input processing 52, the deflection circuit 53 and the video circuit 54 so that icon 42, in accordance with the kinds of the surveillance signals S1, is displayed in the icon display area 11b. For example, control unit 51 controls the displaying icon, such as icon 42-1, which notifies the occurrence of fire, if the surveillance signals S1 are signals S1a from the fire detector 20a (FIG. 1) indicating a fire. A specific example of a control method for displaying icon 42 in the icon display area 11b will be described in detail in the following with reference to the figure.

Next, operation of the front-door intercom 1, having a configuration as described, will be described.

The total operation of the front-door intercom 1 will be described. In the front-door intercom 1, the subsidiary apparatus 2 picks up the images of visitors outside by the camera 13 and transmits the picked up image to the master apparatus 3. Also, the subsidiary apparatus 2 obtains the voices of visitors by the microphone of the communicator 14 and transmits the obtained voice to the master apparatus 3. The subsidiary apparatus 2 obtains audio signals from the master apparatus 3, and the voice based on the obtained audio signals are outputted from the speaker of the communicator 14. A method of transmitting voice and image from the subsidiary apparatus 2 to the master apparatus 3 is, for example, a method in which frequency modulation signals are generated by frequency-modulating the image signals obtained by the camera 13 and the audio signals obtained in the communicator 14, respectively, and then transmitting the frequency modulation signals after frequency-multiplying.

The master apparatus 3 outputs voice from a handset 12 based on the audio signals obtained from the subsidiary apparatus 2 and outputs the voice of the user of the master apparatus 3 to the subsidiary apparatus 2. Also, the master apparatus 3 monochrome-displays a picture based on the image signals obtained from the subsidiary apparatus 2 as a main picture 41 in the main picture display area 11a of the picture display unit 11. Furthermore, the master apparatus 3 always supervises the surveillance signals S1 from the peripheral apparatuses 20 and, if necessary, displays icon 42 in accordance with the kinds of surveillance signal S1 in the icon display area 11b of the picture display unit 11. For example, the master apparatus 3 displays an icon in the shape of the icon 42-1, as shown in FIG. 3, if the surveillance signals S1 are signals S1a from the fire detector 20a (FIG. 1) indicating a fire. Also, the master apparatus 3 displays an icon with the shape of icon 42-2, as shown in FIG. 3, if the surveillance signals S1 are signals S1d from the electric key 20c indicating changes in the locking state.

Next, a specific example of a control method for displaying the icon 42 in the icon display area 11b will be described by mainly referring to FIG. 20 to FIG. 22.

In the flat CRT 30 according to the embodiment, as described, a phosphor layer in the shape of the icons to be displayed is readily formed in the second phosphor layer 34b. Therefore, control for displaying the icon may be performed in a manner that the electron beams EB are emitted thoroughly and uniformly on the region of the second phosphor layer 34b corresponding to the icon to be displayed. This control may be performed by, for example, a method in which the intensity level of the image signals is controlled or a method in which the deflection direction of the electron beams EB is controlled together with the intensity level of the image signals.

In a method for controlling the intensity level of image signals, the control unit 51 (FIG. 3) controls the image signal input processing 52 and the video circuit 54 so that the intensity level of the portion of the inputted image signals corresponding to the icon display area 11b becomes black level by applying the blanking signals and the intensity level of the portion corresponding to the icon 42 to be displayed becomes white level by superimposing image signals for the icon display onto the image signals to which the blanking signals have been applied. The blanking signals and the image signals for icon display are formed by, for example, the control unit 51 and are outputted to the image signal input processing 52 and the video circuit 54. The image signal input processing 52 and the video circuit 54 output the inputted image signals Vin after applying the blanking signals and the image signals for icon display from the control unit 51.

Figure 20:
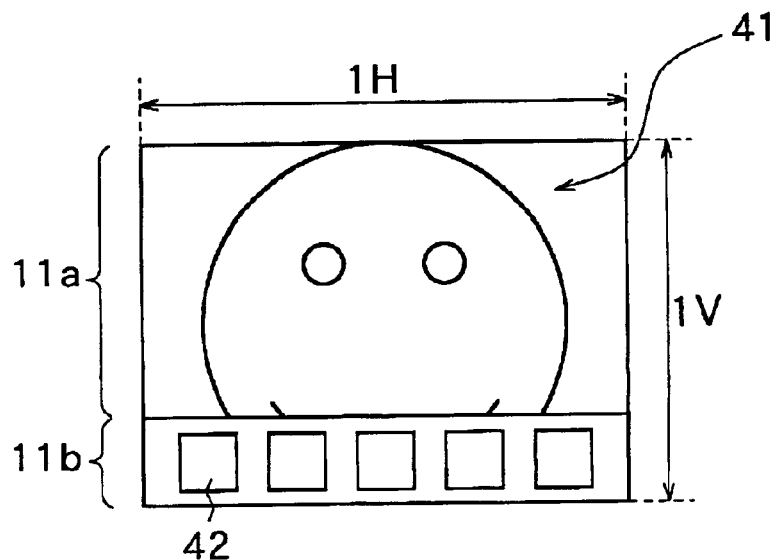
FIG. 20 is a figure for describing an example of a picture display in the case where icons are displayed by controlling the intensity level of picture signals.

In a display example shown in FIG. 20, by applying the blanking signals to the image signals of the portion corresponding to the icon display area 11b in one vertical scanning period (1V), the lower region of the main picture 41 displayed in the main picture display area 11a becomes blank. The blank region becomes icon display area 11b. In the display example, the aspect ratio of the total display area, including the main picture display area 1a and the icon display area 11b, is set to be almost 4:3.

Figure 21:
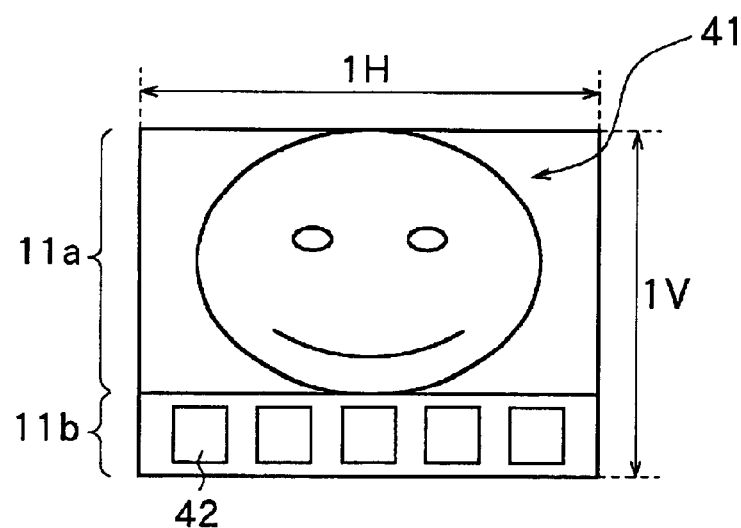
FIG. 21 is a figure for describing another example of picture display in a flat CRT.

FIG. 21 shows an example in which the main picture 41, which has been compressed, is displayed in the main picture display area 1a, and icon 42 are displayed by superimposing image signals for the icon display to the remaining portion of the vertical scanning period obtained by compressing. There is a method of displaying the main picture 41 after compressing in which, in the main picture display unit 11a, the magnitude of the vertical saw tooth for performing vertical deflection applied to the deflection yoke is made smaller than usual. The main picture 41 may also be displayed after being compressed by being partially thinned out (thinning out the scanning line). In the display example, the aspect ratio of the total display area, including the main picture display area 11a and the icon display area 11b, is also set to be almost 4:3.

Figure 22:
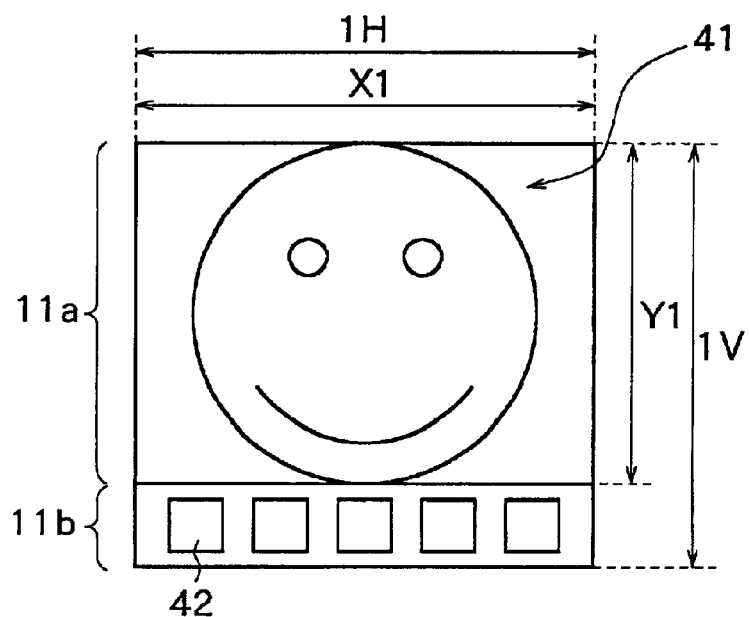
FIG. 22 is a figure for describing still another example of a picture display in a flat CRT.

In a display example shown in FIG. 22, the aspect ratio of the total display area, including the main picture display area 11a and the icon display area 11b is set to be almost 1:1. Such display can be achieved by, for example, making the scanning period longer than usual by shortening the blanking interval of the saw tooth for performing the vertical deflection and scanning the icon display area 11b in the extended scanning period.

Control methods of displaying the icon 42 are not limited to the ones mentioned above, but other methods may be used.

As described in the embodiment, the main picture is monochrome-displayed in the main picture display area 11a by emission in the first phosphor layer 34a formed of white emission phosphor while providing the second phosphor layer 34b formed of a different phosphor in a region different from the first phosphor layer 34a, in order to perform an icon display as another picture in a color different from the main picture by emission of the second phosphor layer 34b. Therefore, a picture display in a color, different from the color of the display of the main picture can be easily performed.

According to the embodiment, color display of icon is possible. Therefore, the warning effect in the case of using the front-door intercom 1 as a security system can be improved. In the related art, icon-warning symbols can be displayed on the screen by a superimposing method (a composing method of screens in which one screen is formed by superimposing two or more screens). The superimposing can be achieved by installing special software on a signal processing system. However, in the case of apparatuses that perform monochrome display, the warning effect for drawing attention cannot be expected since color display of the warning symbols cannot be performed. According to the embodiment, this problem can be solved. Furthermore, according to the embodiment, color display can be performed using the driving circuit of the CRT for monochrome display as the drive for the flat CRT 30. Therefore, color display can be achieved easily at low cost. Also, in the embodiment, the shapes of the icons are directly formed in the fluorescent screen so that even icons with complicated shapes can be displayed with high precision.

In the embodiment, it is not necessary to provide another display device using a lamp or the like in addition to a picture display device for displaying a picture from the subsidiary apparatus 2, like in the related art. Therefore, a color display can be achieved at low cost and without enlarging the size of the master apparatus 3. For example, in the embodiment, it is not necessary to provide a lamp for performing color display and to separately provide a lamp display area for performing color display so that the device can be minimized. Also, in the embodiment, it is not necessary to separately provided a display area for a lamp or the like so that desirable designs of the device can be achieved.

The invention is not limited to the above-mentioned embodiment, but various kinds of modifications are possible. For example, in addition to a front-door intercom, the invention can be broadly applied to devices comprising a display unit, which performs monochrome display of the main picture. For example, the invention can be applied to various kinds of monitor apparatuses such as portable television monitors or the like. Also, the invention is not limited to use in picture displays for security surveillance but can be applied to other usages. For example, the invention can be applied to the case where preferred pictures of the user are displayed always or upon request.

Furthermore, in the invention, the case of a reflection-mode flat CRT is described. However, the invention can be applied to a transmission-mode flat CRT. In the transmission-mode flat CRT, the picture is displayed from a screen panel side in which the phosphor layer 34 is provided, which is from the opposite side of the reflection-mode flat CRT 30, with the screen panel in between. If the transmission-mode flat CRT is used, in the configuration of the flat CRT shown in FIG. 2, a transparent conductive film (for example, a conductive film made of ITO: indium-tin oxide film) is provided in the inner wall of the screen panel 31 instead of a reflection film (not shown in the figure), and the phosphor layer 34 is formed on the transparent conductive film. Also, in the case of the transmission-mode flat CRT, a picture is observed from the opposite side (screen panel side) of the front panel 32. Therefore, a back panel is provided instead of the front panel 32. A conductive film is applied on almost the whole surface of the inner wall of the back panel facing the fluorescent screen, and anode voltage is applied to the conductive film. Other basic configurations, operations and effects are identical to those of the reflection-mode flat CRT.

Moreover, the invention, in addition to the flat CRT, also can be applied to a so-called straight cathode ray tube in which electron beams from electron guns are vertically emitted to the center of the fluorescent screen. Also, in the above-mentioned embodiment, the first phosphor layer 34a is formed of white emission phosphor and the main picture is monochrome-displayed. However, the first phosphor layer 34a may be formed of a single-color emission phosphor other than white, and the main picture may be monochrome-displayed in a color other than black and white.

Also, in the embodiment, icon 42 is easily displayed in the icon display area 11b by readily forming the second phosphor layer 34b in the perfect shape of the icons to be displayed. However, the second phosphor layer 34b may be formed without being in the shape of icons. In other words, the icon display may be performed by uniformly forming a phosphor which emits colors different from the white emission phosphor forming the first phosphor layer 34a in the region where the icon 42 to be displayed, and by scanning the uniformly-formed phosphor layer by electron beams in the shape of the icons to be displayed. In this case, the picture of the icon representing warnings and the like is displayed by, for example, providing a character signal generator for forming the picture of the icon and superimposing image signals formed by the character signal generator onto the image signals inputted in a normal state. In this method, although it is necessary to provide a character signal generator for forming the picture of the icon, the icon display can be performed in a color different from the picture in the main picture display area 11a.

Obviously many modifications and variations of the present invention are possible in light of the above teachings. It is, therefore, understood that within scope of the appended claims, the invention may be practiced otherwise than as specifically described.

What is claimed is:

1. A cathode ray tube displaying a main picture in a single color comprising:

an electron gun for emitting electron beams;

a first picture display unit, including a phosphor which emits a single color upon incidence of electron beams while displaying a main picture by emission of the single color emission phosphor; and a second picture display unit including another phosphor which emits another color different from the single color emission phosphor upon incidence of electron beams in a region different from the region where the single color emission phosphor is provided for displaying another picture in a color different from that of the display of the main picture by emission of the another phosphor, wherein, in a system comprising a front-door intercom which comprises a subsidiary apparatus, including an image pickup apparatus and a master apparatus including a display unit which can display the picture picked up by the image pickup apparatus, and a peripheral apparatus for safety surveillance connected to the front-door intercom, the cathode ray tube is applied to the display unit of the master apparatus of the front-door intercom, and the picture picked up by the image pickup apparatus is displayed in the first display unit as the main picture, while displaying another picture different from the main picture in the second picture display unit according to surveillance signals from the peripheral apparatus.

2. A cathode ray tube as set forth in claim 1, wherein another phosphor provided in the second picture display unit is formed in accordance with another picture to be displayed.

3. A cathode ray tube as set forth in claim 1, wherein another phosphor provided in the second picture display unit includes a phosphor in a plurality of colors, which emits different colors from each other.

4. A cathode ray tube as set forth in claim 1, wherein the another phosphor provided in the second picture display unit is provided by thermal transfer printing.

5. A cathode ray tube as set forth in claim 1, wherein the in the second picture display unit is provided at least in one among four regions of above, below, the left-hand side and the right-hand side of the region wherein the single color emission phosphor is provided.

* * * * *

UNITED STATES PATENT AND TRADEMARK OFFICE
CERTIFICATE OF CORRECTION

PATENT NO.   : 6,822,699 B2
DATED        : November 23, 2004
INVENTOR(S)  : Koichi Furui It is certified that error appears in the above-identified patent and that said Letters Patent is hereby corrected as shown below:

Column 14,
Line 55, "in the second" should read -- another phosphor provided in the second --.

Signed and Sealed this

Nineteenth Day of April, 2005

JON W. DUDAS
*Director of the United States Patent and Trademark Office*